United States Patent
Tsukizaki

(10) Patent No.: US 8,427,471 B2
(45) Date of Patent: Apr. 23, 2013

(54) PROGRAM EXECUTION SYSTEM, PROGRAM EXECUTION DEVICE AND RECORDING MEDIUM AND COMPUTER EXECUTABLE PROGRAM THEREFOR

(75) Inventor: Shinya Tsukizaki, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/466,561

(22) Filed: May 8, 2012

(65) Prior Publication Data

US 2012/0218311 A1   Aug. 30, 2012

Related U.S. Application Data

(63) Continuation of application No. 13/311,604, filed on Dec. 6, 2011, now Pat. No. 8,212,822, which is a continuation of application No. 09/902,224, filed on Jul. 10, 2001, now Pat. No. 8,194,078.

(30) Foreign Application Priority Data

Jul. 17, 2000 (JP) ................................ 2000-216545

(51) Int. Cl.
- G06T 15/00 (2006.01)
- G06T 1/00 (2006.01)
- G06F 17/00 (2006.01)

(52) U.S. Cl.
USPC .......................................... 345/419; 345/418

(58) Field of Classification Search .................... 345/419
See application file for complete search history.

(56) References Cited

U.S. PATENT DOCUMENTS

| 5,566,280 A | 10/1996 | Fukui et al. |
| 6,034,692 A | 3/2000 | Gallery et al. |
| 6,126,545 A | 10/2000 | Takahashi et al. |
| 6,155,926 A | 12/2000 | Miyamoto et al. |
| 6,283,857 B1 | 9/2001 | Miyamoto et al. |

(Continued)

FOREIGN PATENT DOCUMENTS

| JP | 9-50539 | 2/1997 |
| JP | 9-305301 | 11/1997 |

(Continued)

OTHER PUBLICATIONS

United States Office Action dated Feb. 25, 2004, from corresponding U.S. Appl. No. 09/902,224.

(Continued)

*Primary Examiner* — Jacinta M Crawford
(74) *Attorney, Agent, or Firm* — Katten Muchin Rosenman LLP

(57) ABSTRACT

A program execution system, has a program execution device which has a controller operated by a user and a display on which images such as characters or players in a game are seen. In order to prevent an incorrect movement of a character on the display when a switching from one scene viewed from one camera viewpoint to another scene viewed from another camera viewpoint without additional steps by the user, the program execution system has a computer-readable and executable program stored on a recorded medium providing a character motion direction step by which, if along the motion of a character on the screen a switching is made from one scene to another, the direction of motion of the character in the second scene is maintained in coordination with the character's motion direction on a map in the first scene at least immediately before the switching.

8 Claims, 9 Drawing Sheets

U.S. PATENT DOCUMENTS

| | | |
|---|---|---|
| 6,325,717 B1 | 12/2001 | Kawagoe et al. |
| 6,354,944 B1 | 3/2002 | Takahashi et al. |
| 6,377,264 B1 | 4/2002 | Iizuka et al. |
| 6,454,652 B2 | 9/2002 | Miyamoto et al. |

FOREIGN PATENT DOCUMENTS

| | | |
|---|---|---|
| JP | 10-15242 | 1/1998 |
| JP | 10-66781 | 3/1998 |
| JP | 10-113465 | 5/1998 |
| JP | 10-113466 | 5/1998 |
| JP | 10-230075 | 9/1998 |
| JP | 11-15595 | 1/1999 |
| JP | 11-86031 | 3/1999 |
| JP | 11-137842 | 5/1999 |
| JP | 2000-24313 | 1/2000 |
| JP | 2000-126457 | 5/2000 |
| JP | 2000-153063 | 6/2000 |

OTHER PUBLICATIONS

United States Office Action dated Nov. 18, 2005, from corresponding U.S. Appl. No. 09/902,224.
United States Advisory Action dated Apr. 6, 2006, from corresponding U.S. Appl. No. 09/902,224.
United States Office Action dated Oct. 20, 2006, from corresponding U.S. Appl. No. 09/902,224.
United States Office Action dated Aug. 1, 2007, from corresponding U.S. Appl. No. 09/902,224.
United States Office Action dated Apr. 30, 2008, from corresponding U.S. Appl. No. 09/902,224.
United States Office Action dated Jan. 22, 2009, from corresponding U.S. Appl. No. 09/902,224.
United States Office Action dated Sep. 16, 2009, from corresponding U.S. Appl. No. 09/902,224.
United States Office Action dated Jun. 8, 2010, from corresponding U.S. Appl. No. 09/902,224.
United States Office Action dated Feb. 1, 2011, from corresponding U.S. Appl. No. 09/902,224.
Questioning dated May 30, 2006, from corresponding Japanese Application No. 2001-199216.
ASCII Corporation "Sonic Adventure Operation Guide" Jan. 7, 1999, p. 37.
ASCII Corporation "Bio Hazard: Inside of Bio-Hazard" Mar. 22, 1997, p. 13.
Japanese Rejection of the Application dated Oct. 12, 2010, from the corresponding Japanese Application.
"Brave Fencer Musashiden" Dengeki Play Station, Japan, Media Works, Aug. 28, 1998, vol. 4, No. 19, pp. 50-69.
Rejection of the Application dated Nov. 8, 2011, from corresponding Japanese Application No. 2010-277041.
Akira Yamashita, et al. "Biohazard 3 Last Escape Official Guide Book Dasshutsu Suikou Hen First Edition" Capcom Co., Ltd., Oct. 6, 1999, pp. 16-21.
United States Office Action dated Feb. 2, 2012, from corresponding U.S. Appl. No. 13/311,604.

PROGRAM EXECUTION SYSTEM, PROGRAM EXECUTION DEVICE AND RECORDING MEDIUM AND COMPUTER EXECUTABLE PROGRAM THEREFOR

CROSS-REFERENCE TO RELATED APPLICATIONS

This application is a continuation of U.S. Application Ser. No. 13/311,604, filed on Dec. 6, 2011, now U.S. Pat. No. 8,212,822, issued Jul. 3, 2012, which is a continuation of U.S. Application Ser. No. 09/902,224, filed on Jul. 10, 2001, now U.S. Pat. No. 8,194,078, issued Jun. 5, 2012, which claims Foreign Priority to Japanese Application Ser. No. 2000-216545, which was on filed Jul. 17, 2000 and which is hereby incorporated by reference in its entirety for all purposes.

BACKGROUND OF THE INVENTION

1. Field of the Invention

The present invention relates to a recording medium on which are recorded a program and data to be used in a program execution system that has a program execution device, an operation device, and a display device, etc., the program itself, the program execution system, and the program execution device.

2. Description of the Prior Art

As information devices such as a program execution system that include a video game machine, there are, for example, entertainment systems by which one plays a game while operating an operation device to cause the game content, that is stored on a CD-ROM or other recording medium, to be displayed on the screen of a television receiver.

Between the program execution device and the operation device in these entertainment systems, the connection is normally made by a serial interface, and when a clock pulse is sent from the program execution device, key switch information, etc. is sent from the operation device that corresponds to the operation of the user, synchronized with this clock pulse.

Also, recently systems have been developed and made practical in which a vibration generation unit is provided, that gives a vibration to the user (also called the player) upon demand from outside (for example, a program execution device) into an operation device, and, for example, while a game is being played various vibrations are given to the user in response to operations by the user.

As shown for example in FIG. 3, if an arbitrary character 106 is to be displayed on the screen of the monitor, character 106 is displayed by taking as the standard, among multiple Camera viewpoints 100 and 102, the camera viewpoint 100 or the camera view point 102 that is associated with the position from which character 106 is to be displayed. Shown in FIG. 4 is an example, which is an image in which main road 104 extends straight in the depth direction from the near position on screen 110 and in which character 106 is displayed closer to the front than the location of intersection 108. In this case, as shown in FIG. 3, the camera viewpoint 100 is on a main road 104 and is set to a position that is nearer to the front than character 106.

As also shown in FIG. 4, if the user uses, for example a direction key on the operation device and operates character 106 so that for example it proceeds straight along the main road 104 the character 106 will move along the main road 104 in accordance with the operation input. However, when character 106 is positioned in the middle of intersection 108, the scene changes and, as shown in FIG. 5, character 106 is displayed from another camera viewpoint 102. As shown in FIG. 3, the other camera viewpoint 102 is the camera viewpoint set at the right front corner C4 which is one of the four corners C1-C4 at intersection 108. Thus, as shown in FIG. 5, main road 104 changes at the image and extends obliquely towards the right in the depth direction on screen 110.

The movement of character 106 after the switch to the other scene becomes a movement depending on the other camera viewpoint 102, and if, for example the upward direction key is operated by the user then, as shown in FIG. 6, character 106 will move upwards on screen 110 and will go off the main road 104 which extends obliquely towards the right.

Therefore, when the user is operating character 106 so that it advances straight along the main road 104 from the position shown in FIG. 4, if a switch to a different scene is suddenly made by the user, then character 106 will in this way depart from the main road 104. Therefore, the instant the scene changes to the scene shown in FIG. 5, the user must go to the trouble of switching to operations that correspond to the new scene.

Specifically, in the situation where character 106 is being chased by a monster, etc. or in the situation in which it will cross main road 104 within a limited time, etc., then every time the scene changes, one must manipulate character 106 by changing the operation, which creates a dilemma.

SUMMARY OF THE INVENTION

It is an object of the present invention, to avoid the above-described disadvantages of the prior art and provide a recording medium on which programs and data are recorded, a program execution system, a program and a program execution device whereby, even if the scene on the screen of the monitor changes, one event by the movement of a character immediately before the scene change (for example, proceeding straight along the main road) is also reflected as is in the scene after its change, and it is no longer necessary to alter the operation while confirming the direction of the main road every time the scene changes, and therefore the operability of the entertainment device can be greatly improved.

The above and other objects of the present invention are attained by a recording medium on which are recorded a program and data to be used in a program execution system that has a program execution device that executes various programs, at least one operation device into which operation requests as operation instructions to said program execution device are input by the user, and a display device that displays images outputted from the program execution device wherein the program has a step of maintenance of a direction of motion of any character on a screen of the display device wherein if, along with the motion of any character on the screen, based on an operation instruction on a direction, a switching is made from a first scene to a second scene on a said screen and said operation instruction is maintained and the direction of motion of said character in said second scene is maintained in accordance with the direction of motion of the character on a map in said first scene at least immediately before the switching is made.

The objects of the present invention are also achieved by a computer-readable and computer-executable program used in a program execution system that has a program execution device that executes various programs, at least one operation device into which operation requests as operation instructions to said program execution device, are inputted by the user, and a display device that displays images outputted from said program execution device, the program having a step of maintenance of a direction of motion of any character on a screen of the display device wherein if, along with the motion of any character on the screen based on an operation instruction on a direction, of said motion, switching is made from a first scene to a second scene on said screen and said operation instruction is maintained, and the direction of motion of said character in said second scene is maintained in coordination with the direction of motion of the character on a map in said first scene at least immediately before the switching is made.

A program execution system of the present invention comprises a program execution device that executes various programs, at least one operation device into which operation requests as operation instructions to said program execution device are inputted by the user, a display device that displays images outputted from said program execution device, and an image motion direction maintenance means which is a program that is executed in a controller in said program execution device wherein if, along with a motion of any character on the display device based on an operation instruction on a direction, of motion of any character a switching is made from a first scene to a second scene on the display device and said operation instruction is maintained, the direction of motion of said character in said second scene is maintained in accordance with the direction of motion of the character on a map in said first scene at least immediately before the switching is made.

A program execution device of the present invention to which can be connected at least an operation device that outputs operation requests by the user as operation instructions, and a display device for displaying images, comprises a direction maintenance means wherein if, along with the motion of any character based on an operation instruction on a direction of motion of a character on the display device, a switching is made from a first scene to a second scene on said display device and said operation instruction is maintained and the direction of motion of said character in said second scene is maintained in accordance with the direction of motion of the character on a map in said first scene at least immediately before the switching is made.

Thus, even if the scene changes from a first scene to a second scene, and one event by the motion of a character immediately before the change (for example, proceeding straight along a main road) is also reflected as is in the second scene after the change, it is no longer necessary to alter the operation while confirming the character motion direction every time the scene changes, and the operability of the entertainment can be greatly improved.

Also, if the first scene is to be drawn based on a coordinate change in accordance with a first viewpoint and the second scene is to be drawn based on a coordinate change in accordance with a second viewpoint, the direction maintenance step (means) may have a computation step (means) that computes the direction of motion of the character based on the first viewpoint.

Also, the present invention may compromise a first computation step (means) that determines, from the motion vector of any character by current operation instructions as seen from the prescribed viewpoint, at least the position coordinates of the character, a viewpoint switching step (means) that switches the viewpoint if necessary based on the position coordinates of the character, a second computation step (means) that, if the operation instruction is maintained after the switching of the viewpoint, determines, from the motion vector of any character by the operation instruction as seen from the previous viewpoint, at least the position coordinates of the character, and an image drawing step (means) that draws a three-dimensional image of the character based on the current viewpoint, based on the position coordinates of the character obtained by the first computation step (means) and the computation step (means).

In this way, first, in the first computation step (means), at least the position coordinates (for example, the world coordinates) of any character are determined from the motion vector of the character by the current operation input as seen from the specified viewpoint.

Then, in the viewpoint switching step (means), based on the position coordinates of the character it is decided whether the switching of the viewpoint is needed; if so, the viewpoint is switched, and if not, the viewpoint is maintained.

Then, in the image drawing step (means), based on the position coordinates of the character obtained in the first computation step (means), a three-dimensional image of said character based on the current viewpoint is drawn, and the three-dimensional image is displayed.

If the operation instruction is maintained after the switching of the viewpoint, then in the second computation step (means), at least the position coordinates of any character are determined from the motion vector of the character by the operation instruction as seen from the previous viewpoint, and in the following image drawing step (means), based on the position coordinates of the character obtained in the second computation step (means), a three-dimensional image of the character based on the current viewpoint is drawn, and the three-dimensional image is displayed.

The computation processing in the second computation step (means) is continued until the operation instructions are changed.

In this case too, when a change is made from a first scene to a second scene and one event by the motion of a character immediately before the change (for example, proceeding straight along a main road) is also reflected as is in the second scene after the change, it is no longer necessary to alter the operation while confirming the directionality every time the scene changes,

EXPLANATION OF SYMBOLS USED IN THE DRAWINGS

Figure 1:
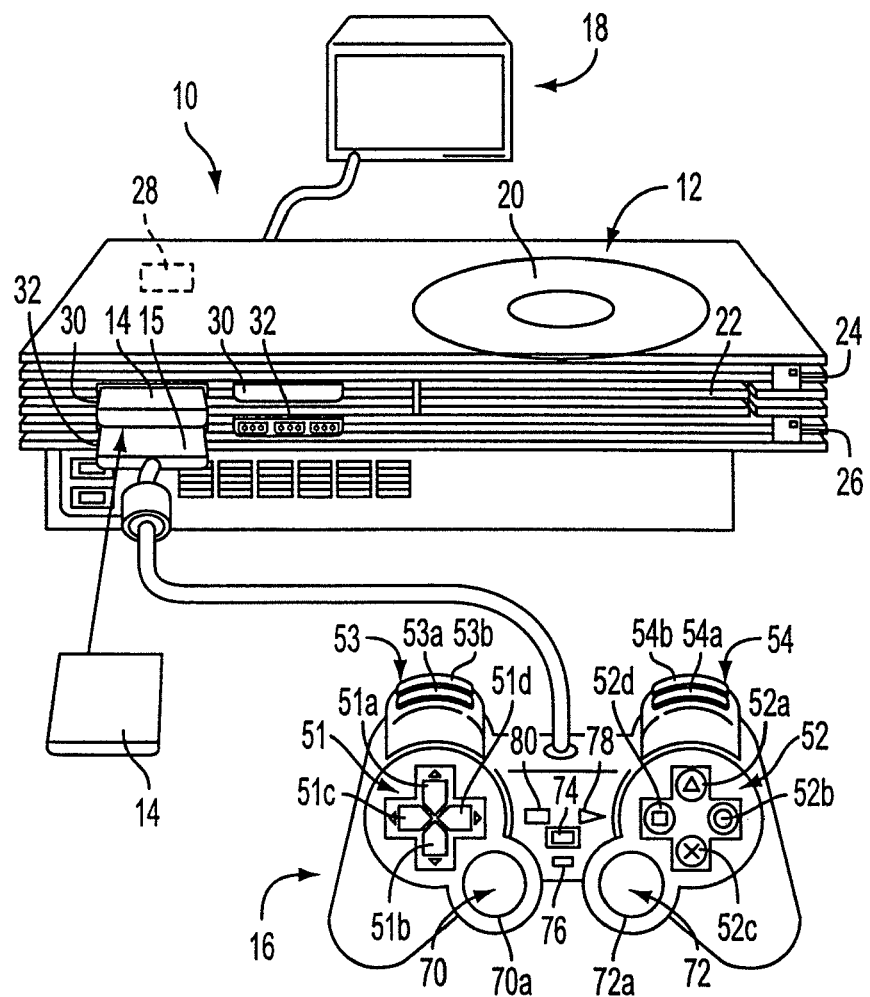
FIG. 1 is a diagrammatical perspective view of an entertainment system of the present invention.

10 ... entertainment system
12 ... entertainment device
16 ... operation device (controller)
18 ... monitor (display)
20 ... optical disk
100 ... first camera viewpoint
102 ... second camera viewpoint
104 ... main road
106 ... character
108 ... intersection (crossroads)
110 ... screen
200 ... image processing means
202 ... first vector computation means
204 ... first position computation means
206 ... viewpoint switching means
214 ... direction maintenance means
216 ... second vector computation means
218 ... second position computation means

DETAILED DESCRIPTION OF THE PREFERRED EMBODIMENTS

In the following we describe, with reference to FIGS. 1-11, an embodiment in which the recording medium, program execution system, and program execution device of the present invention are applied to an entertainment system that is used for video games, etc.

As shown in FIG. 1, an entertainment system 10 of the embodiment of the present invention includes an entertainment device 12, which excludes various programs, a memory card 14, which is detachable from entertainment device 12, an operation device (controller) 16, which is detachable from entertainment device 12, and a monitor (display) 18, which is a television receiver or any other suitable display device to which video and audio signals from entertainment device 12 are supplied.

Entertainment device 12 reads programs recorded on a high-capacity storage medium such as for example a CD-ROM or DVD-ROM optical disk 20, etc. and executes games, etc. in accordance with instructions from users (for example, game players, etc.) "Execution of a game" means to receive an input from controller 16 via a connector 15 and control the progress of the game while controlling the display and sound on monitor 18.

As also shown in FIG. 1, entertainment device 12 has the shape of flat stacked rectangular solid objects; arranged on its front panel are a disk tray 22 which moves forward and backward as the disk mounting part into which is mounted the optical disk 20 which is a program and data recording medium, a reset switch 24 for arbitrarily resetting, etc. the program, etc. that is currently being executed, an open button 26 for pulling out the disk tray 22, two insertion openings 30 for memory card 14, and two controller terminals 32 into which connector 15 of controller 16, etc., are to be inserted. A power switch 28 and AV multi-output terminal (not shown) are used on the back side of the entertainment device. The AV multi-output terminals are video and audio output terminals and are connected to monitor 18 via an AV (audiovisual) cable, etc.

Built into entertainment device 12 are; in addition to the control function of displaying characters and scenes on monitor 18 by reading and executing programs from optical disk 20, which is a CD-ROM, DVD-ROM, or other recording medium on which computer game (video game) programs and data are recorded various control functions such as the playback of movies by DVD (digital video disk), and the playback of audio by CDDA (compact disk digital audio), etc., which are other optical disks 20. The entertainment device 12 also has the function of executing programs obtained by communication via a communication network, etc. During the execution of a game program, three-dimensional computer graphics video generated by entertainment device 12 is displayed on monitor 18, which serves as a display device.

In this case, signals from controller 16 are also processed by one of the control functions of entertainment device 12, and their content is reflected on the screen of monitor 18 by, for example, the movement of characters and the changing of scenes.

Controller 16 has first and second operation units 51 and 52 to the left and right of the middle of its top surface and also has third and fourth operation units 53 and 54 on its side surface, and left and right on the front side of its top surface it has a left-side rotation operation control 70 and a right-side rotation operation control 72, which are joy sticks for analog operation.

The first operation unit 51 is a pressing operation unit for giving actions to characters, etc. displayed, for example on the screen of monitor 18; its functions are set by the program, etc. recorded on optical disk 20, and it consists of, for example, four operation keys (direction keys) 51a, 51b, 51c, 51d, which have the function of, for example, moving character 106, etc. up, down, left, right, etc. Direction key 51a is also called the upward key, and direction key 51b is called the downward key, direction key 51c is called the leftward key, and direction key 51d is called the rightward key.

Second operation unit 52 has four cylindrically shaped operation buttons 52a, 52b, 52c, 52d for pressing operation; the identification marks Δ, ○, <X>, □ appear on the top of the respective operation buttons 52a-52d, and operation buttons 52a-52d are also known as Δ button 52a, ○ button 52b, <X>button 52c, and □ button 52d, respectively.

The functions of operation buttons 52a-52d of the second operation unit 52 are set by a program, etc. recorded on optical disk 20, and the functions of for example moving the left arm, right arm, left leg, right leg of a character, etc. are assigned to operation buttons 52a-52d.

Third and fourth operation units 53 and 54, which have about the same structure, each have, one above the other, two operation buttons, namely, operation button (L1 button) 53a and operation button (L2 button) 53b, and operation button (R1 button) 54a and operation button (R2 button) 54b. The functions of the third and fourth operation units 53 and 54 are likewise set by a program, etc. recorded on optical disk 20, and for example functions for special actions are allocated to character 106.

Left and right rotation operation controls 70 and 72 have signal input elements, such as variable resistors, that enable each operation shaft to rotate 360° about their respective operation shafts, and analog values are outputted in accordance with the tilting action. These left and right rotation operation controls 70 and 72 are restored to their neutral position by spring members (not shown). Also, a signal separate from the analog value associated with the tilting action of rotation operation controls 70 and 72 is outputted by pressing each of controls 70 and 72 downward. That is, left and right rotation operation controls 70 and 72 have the functions of operation button (L3 button) 70a and (R3 button) 72a as fifth and sixth operation units for pressing operation.

By rotating and tilting left and right rotation operation controls 70 and 72, it is possible to input command signals that make it possible to perform such analog motions as, for example, moving the character 106, etc. while rotating it, or moving it while varying its speed, and changing its position.

In FIG. 1, left and right rotation operation controls 70 and 72 can be used switching between them said first and second operation units 51 and 52. This switching is done by an analog mode switch 74. When left and right rotation operation controls 70 and 72 are selected by analog mode switch 74, a display unit 76 lights up, displaying the selected status of left and right rotation operation controls 70 and 72.

Provided on controller 16 are, in addition to elements described above, a start button (start switch) 78, which gives the instruction to begin the game, etc., and a select button (selector switch) 80 for selecting the degree of difficulty of the game when the game is begun, etc.

Figure 2:
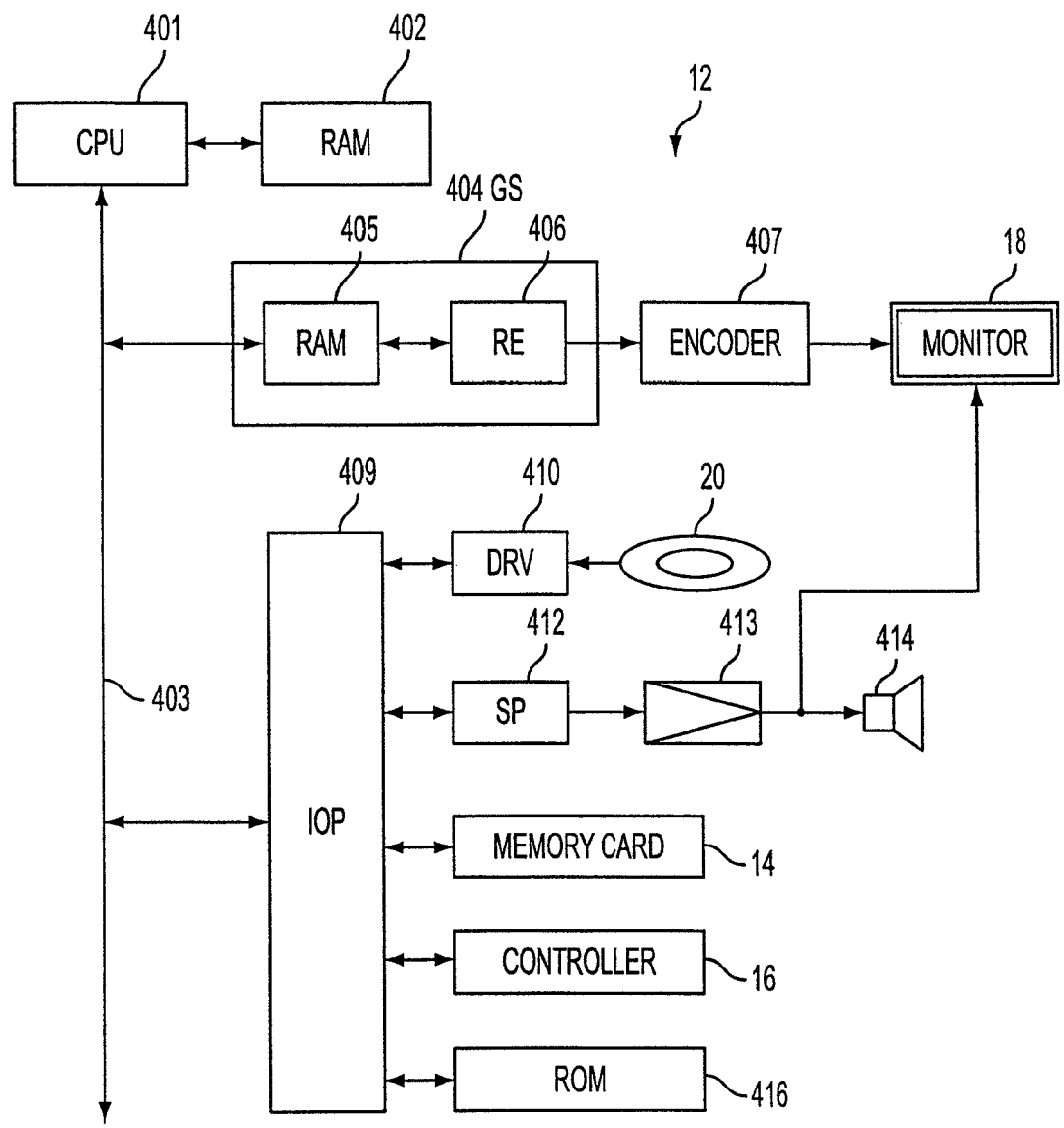
FIG. 2 is a block diagram of a circuit of the entertainment device of the invention.

Next, referring to the block diagram shown in FIG. 2, we describe the internal structure and general operation of entertainment device 12 shown in FIG. 1.

In the entertainment device 12, a RAM 402 as a semiconductor memory and a bus 403 are each connected to a CPU 401 which controls said entertainment device 12.

Connected to bus 403 are a graphic synthesizer (GS) 404 and an input-output processor (10P) 409. Included in GS 404 are a RAM (image memory) 405 which includes a frame buffer, a Z buffer, and a texture memory, etc., and rendering an engine 406, which has rendering functions that include the function of drawing to the frame buffer in the image memory 405.

Connected to GS 404, is the monitor 18 as an external device, and the connection is made via an encoder 407 for, for example, converting digital RGB signals, etc. to NTSC-standard television format.

Connected to a 10P 409 are driver (DRV) 410 for playing back and decoding data recorded on optical disk 20, a sound processor (SP) 412, memory card 14 as an external memory consisting of flash memory, controller 16, and a ROM 416, on which the operating system, etc. is recorded. An SP 412 is connected via an amplifier 413 to a speaker 414 and monitor 18 as external devices, and supplies audio signals to them.

Here, the memory card 14, which is a card-type external storage device that consists of, for example, a CPU or gate array and flash memory, is detachable from entertainment device 12 shown in FIG. 2 via its insertion opening 30, and stores intermediate states of the game, a program for DVD playback, etc.

Controller 16 provides to entertainment device 12 commands (binary commands or multi-value commands) by the user's pressing the multiple buttons on the controller. Also, driver 410 has a decoder for decoding images encoded by the MPEG (moving picture experts group) standard.

Next, the procedure of how images are displayed on monitor 18 by operation of controller 16 will be described. It is assumed that object data consisting of polygon vertex data, texture data, etc. recorded on optical disk 20 is read via driver 410 and is held in RAM 402 of CPU 401.

When instructions from a player, who is the user, are inputted into entertainment device 12 via controller 16, based on these instructions, CPU 401 computes the position of the object in three dimensions (3D) and its orientation with respect to the viewpoint. Thus, the polygon vertex data of the object prescribed by the X, Y, Z coordinate values of the three orthogonal axes is changed for each. The post-change polygon vertex data is converted to two-dimensional coordinate data by perspective transformation processing.

The region prescribed by two-dimensional coordinates is a so-called polygon. The post-transformation two-dimensional coordinate data, Z data, and texture data are supplied to GS 404. Based on the post-transformation two-dimensional coordinate data and Z data, GS 404 performs rendering, and performs drawing processing by writing (drawing) successive texture data to the frame buffer of image memory 405. After a one-frame image completed by this drawing processing is encoded by encoder 407, the drawn texture data is supplied to monitor 18 and is displayed as an image on its screen.

Next, referring to FIGS. 3-7, the characteristic functions that entertainment system 10 of this embodiment has, that is, the functions that are realized by programs supplied to entertainment device 12 by, for example, a random-access memory such as optical disk 20 or memory card 14, and by a network.

This function is the one by which if, along with the motion of any character based on operation input (operation instructions from controller 16) concerning the character motion direction, a switch is made from a first scene to a second scene and the operation input is maintained, the direction of motion of character 106 in the second scene is maintained in coordination with the direction of motion of character 106 on the map in the first scene at least immediately before the switching from the first scene to the second scene is made.

Figure 3:
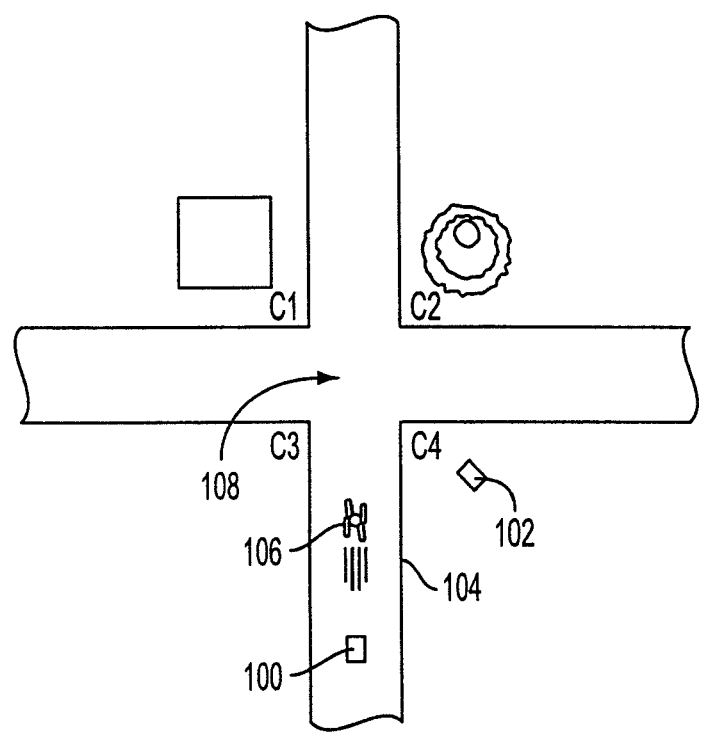
FIG. 3 is an explanatory view showing positions of the first and second camera viewpoints on a display in a conventional operation of the entertainment device.

Specifically, as shown in FIG. 3, assuming two camera viewpoints 100 and 102, the first camera viewpoint 100 is on main road 104 and is set to a position at one side of character 106, and second camera viewpoint 102 is set to the right front corner C4 of the four corners C1-C4 at intersection 108.

Figure 4:
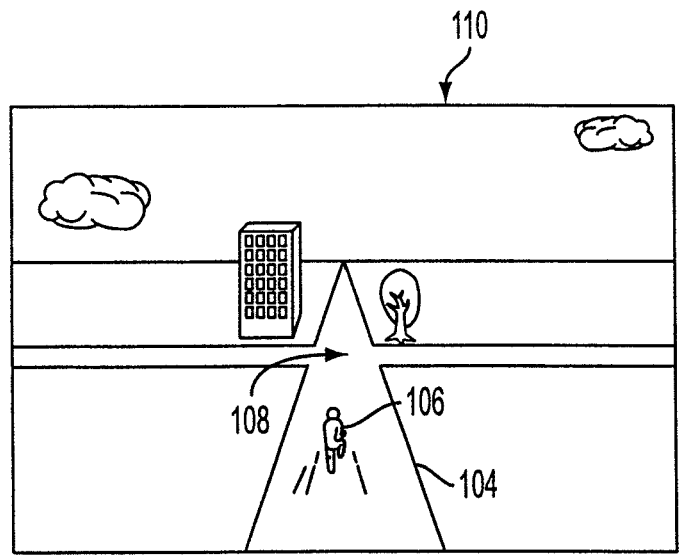
FIG. 4 is an explanatory view showing an example of the display as seen from the first camera viewpoint in the conventional operation of the entertainment device.
Figure 5:
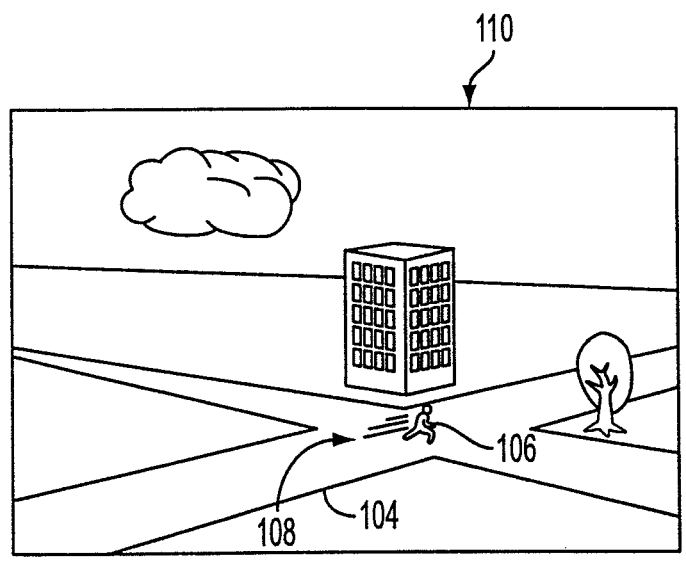
FIG. 5 is an explanatory view showing an example of the display as seen from the second camera viewpoint in the conventional operation of the entertainment device.

FIG. 4 shows an example of the display based on the first camera viewpoint 100 (the first scene); it is an image in which main road 104 extends straight from the front of screen 110 towards the depth direction, and it shows the case in which character 106 is displayed in front of the location of intersection 108. Shown on the screen is a situation in which character 106 is running along the main road 104. FIG. 5 is an example of the display based on second camera viewpoint 102 (the second scene); it is an image in which the main road 104 extends from the front of screen 110 obliquely to the right in the depth direction.

In the first scene shown in FIG. 4, for example, by operating the upward key 51a of the operation controls of controller 16, character 106, in accordance with the operation input, will proceed straight along main road 104. But when character 106 is positioned in the middle of intersection 108, the scene changes, and character 106 will be displayed based on second camera viewpoint 102, as shown in FIG. 5 (the second scene).

Figure 6:
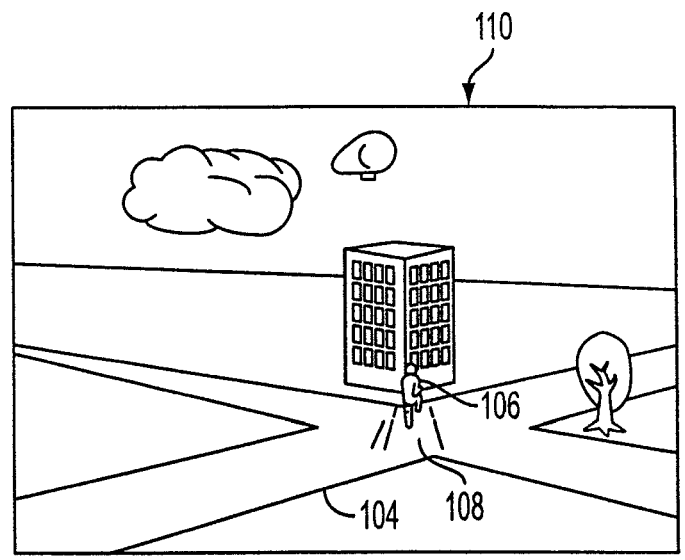
FIG. 6 is an explanatory view showing, for comparison, a drawback of conventional processing in the entertainment device.

Normally the movements of character 106 after the change from the first to the second scene will be movements based on the second camera viewpoint 102, and if, for example, the upward key 51a is operated, character 106 will proceed upward on screen 110 and will leave main road 104, which extends obliquely to the right (see FIG. 6).

However, according to the present invention, when the switching is made from the first scene to the second scene, as long as the operation in the first scene is maintained, the one event due to the motion of character 106 immediately prior to the switching to the second scene (for example, proceeding straight along main road 104) will be reflected as is, even after the change to the second scene.

Figure 7:
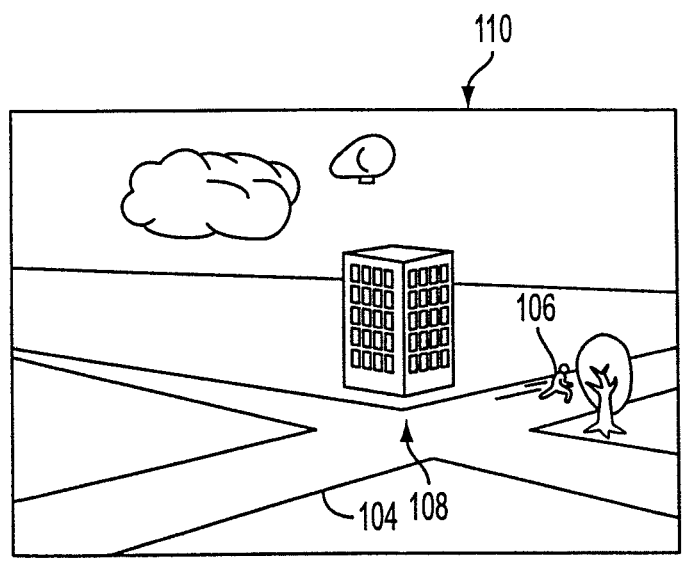
FIG. 7 is an explanatory view showing an example of the display according to the processing of the present invention.

For example, before the change form the first scene to the second scene, that is, in the first scene shown in FIG. 4, if for example the upward key 51a is being operated, then when the change is made to the second scene, character 106 will proceed along main road 104, which extends obliquely to the right, as shown in FIG. 7. The display of this case is achieved by coordinate calculation based on first camera viewpoint 100.

After the change has been made to the second scene, at the stage in which the operation to controller 16 has once changed to another operation, the coordinates for the motion of character 106 will be calculated based on the second camera viewpoint 102. Therefore if at this stage one wishes to have character 106 proceed along main road 104, it suffices to perform an operation in the direction obliquely to the right.

Next, referring to FIGS. 8-11, we describe an example of software (image processing means 200) for realizing the above function.

As described above, image processing means 200 is provided to entertainment device 12 by a random-access memory medium such as optical disk 20 or memory 14, and by a network. Here the description will be made by assuming the case in which it is read into entertainment device 12 from optical disk 20 and is put into operation.

That is, image processing means 200 is run on CPU 401 by, for example, previously downloading it from a specified optical disk 20 to be played on entertainment device 12, going through specified processing, and downloading it into RAM 402 of entertainment device 12.

Figure 8:
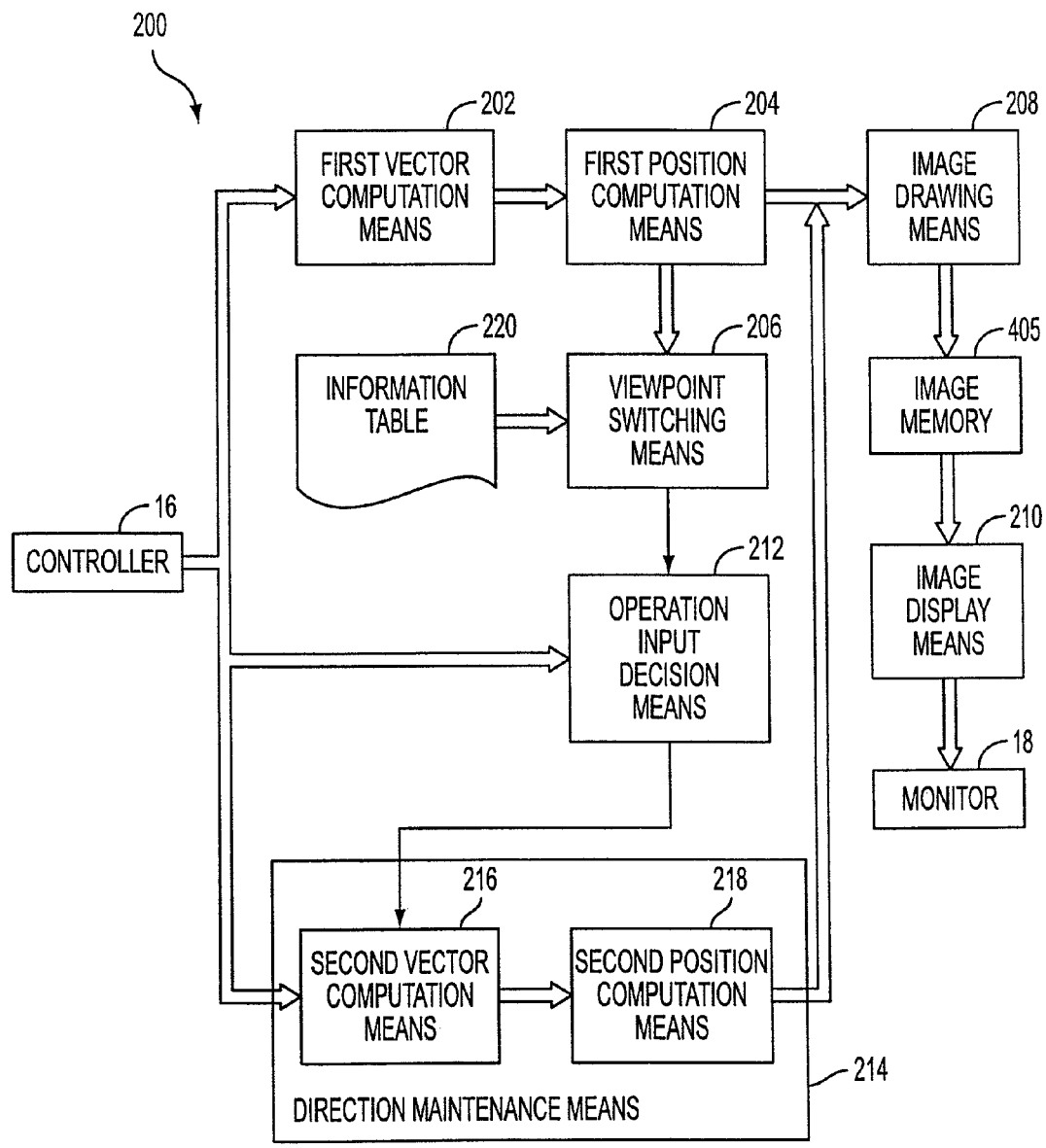
FIG. 8 is a functional block diagram of an image processing unit built into the entertainment system of the invention.

As shown in FIG. 8, image processing means 200 has a first vector computation means 202, which computes the motion vector of character 106 as seen from a specified viewpoint, a first position computation means 204, which computes the coordinates (world coordinates) of character 106 from the motion vector that is obtained, a viewpoint switching means 206, which switches to a viewpoint corresponding to the position of character 106 if a switch of viewpoints is necessary, image drawing means 208, which draws to image memory 405 a three-dimensional image based on the specified viewpoint, and image display means 210, which outputs to monitor 18 the three-dimensional image data drawn to image memory 405 and causes the three-dimensional image to be displayed on screen 110 of monitor 18.

In addition to the above various means, the image processing means 200 also has an operation input decision means 212, which decides whether the operation input from controller 16 has been changed, and a direction maintenance means 214, which, if the operation input is maintained even at the stage at which the viewpoint has changed, maintains the direction of motion of character 106 in coordination with the direction of motion of character 106 on the map in the first scene at least immediately before the switching is made.

The direction maintenance means 214 has a second vector computation means 216, which computes the motion vector of character 106 as seen from the viewpoint before the switch is made (the previous viewpoint), and a second position computation means 218, which computes the coordinates (world coordinates) and orientation of character 106 from the motion vector that is obtained.

Next, referring to the flowcharts of FIGS. 9 and 10, the processing action of the image processing means 200 will be described.

Figure 9:
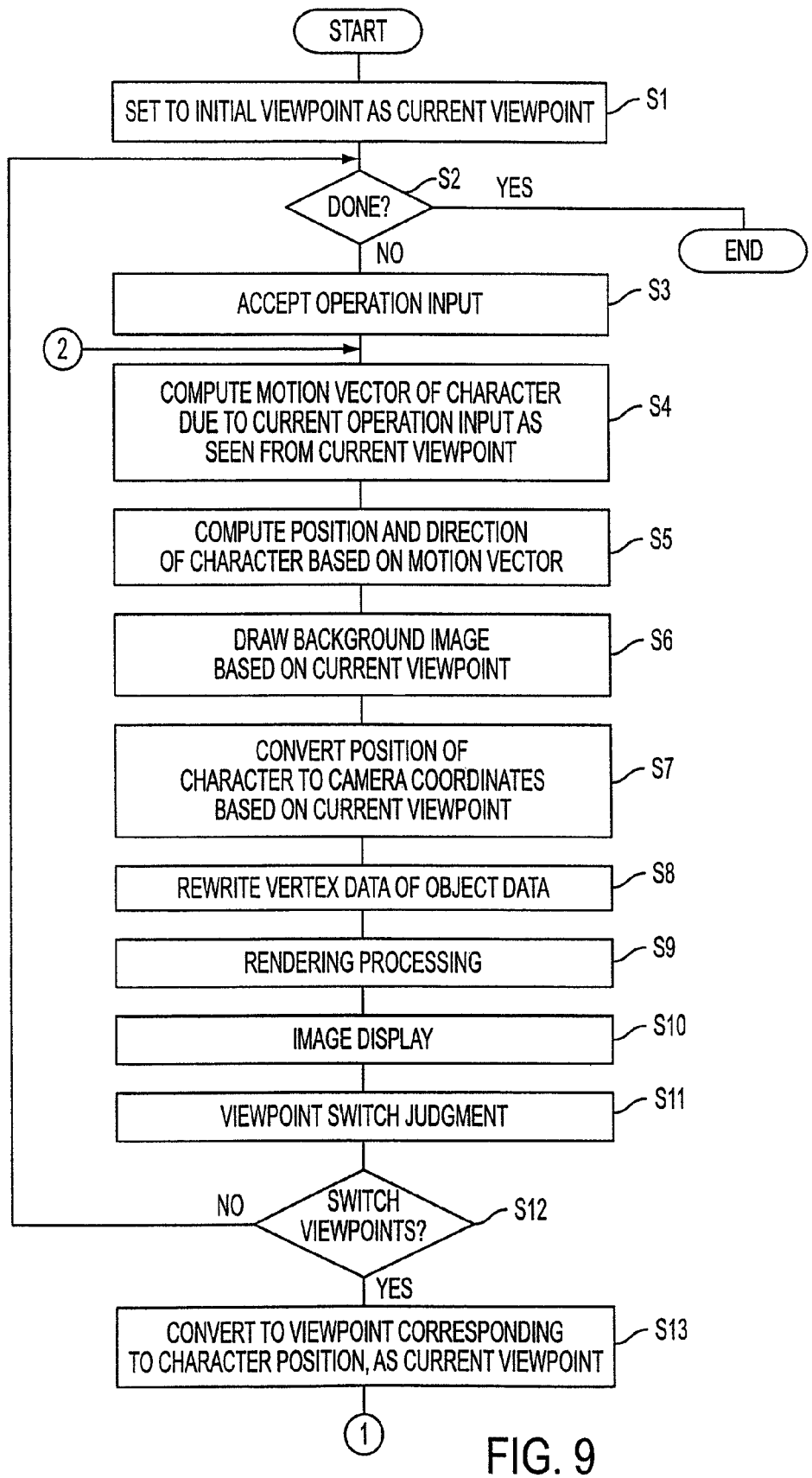
FIG. 9 is a first part of a flowchart of the processing action of the image processing unit of the system of the present invention.
Figure 10:
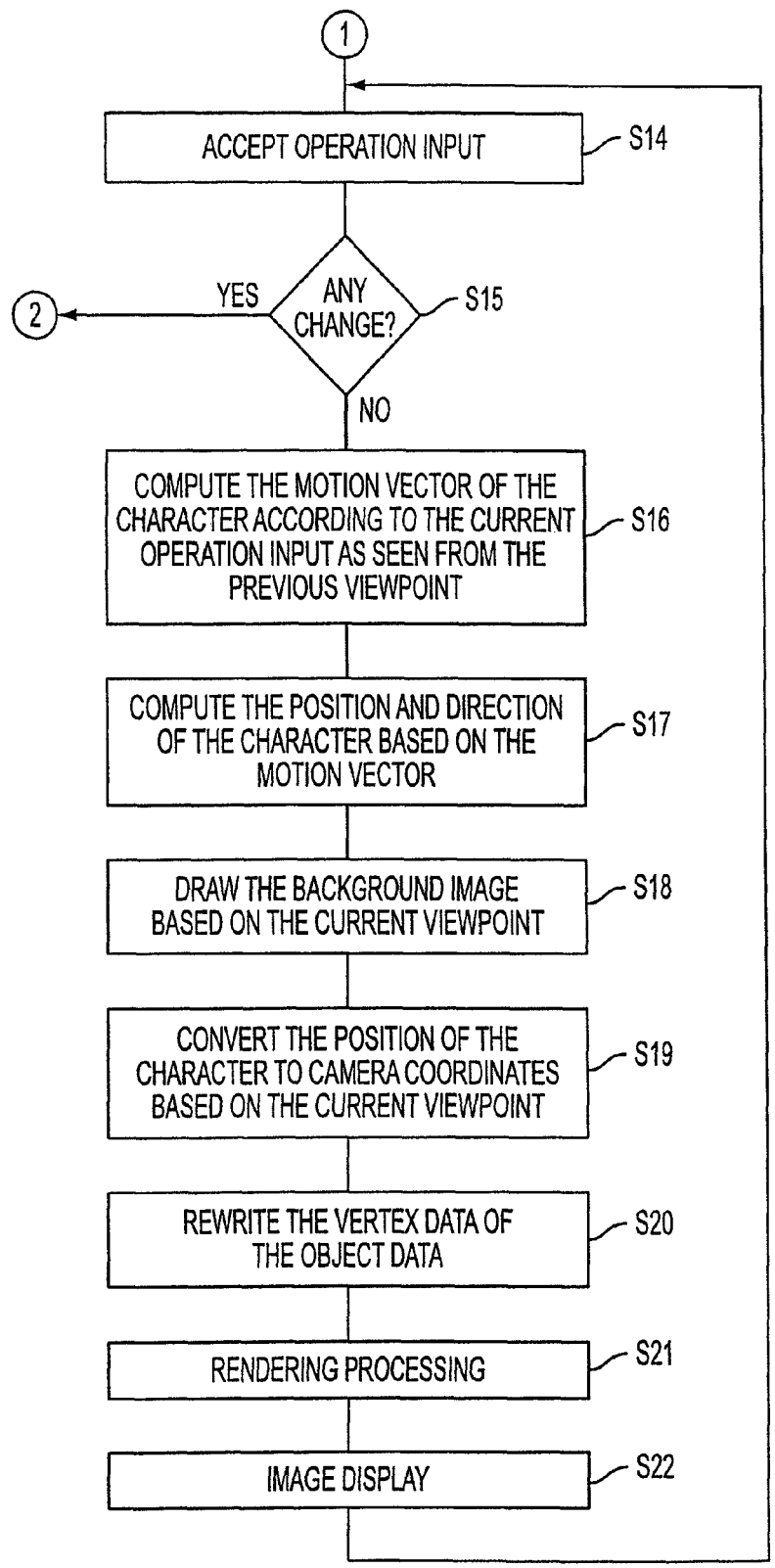
FIG. 10 is a second part of the flowchart of FIG. 9.

The image processing means 200 first sets the initial viewpoint as the current viewpoint in step S1 in FIG. 9, then, in step S2, it is decided whether there is a termination request (power cutoff or game-over request, etc.) to this image processing means 200. If there is no termination request, one proceeds to the following step S3 and receives the operation instructions from controller 16 by the user, that is the operation input.

Next, in step S4, by the first vector computation means 202, the motion vector of character 106 by the current operation input as seen from the current viewpoint is computed; then, in step S5, by the first position computation means 204, the position (world coordinates) of character 106 and its direction with respect to the current viewpoint are computed based on the obtained motion vector.

Next, in step S6, by the image drawing means 208, the background image based on the current viewpoint is drawn to image memory 405. Then, in step S7, the position (world coordinates) of character 106 is converted to camera coordinates based on the current viewpoint.

Next, in step S8, the vertex data of the object data corresponding to said character 106 is rewritten based on obtained camera coordinates. Then, in step S9, by means of image drawing means 208, rendering processing is done for the object data, and a three-dimensional image of said character 106 is drawn to image memory 405. Next, in step S10, by the image display means 210, the three-dimensional image data drawn to the image memory 405 is outputted to monitor 18, and the three-dimensional image is displayed on screen 110 of monitor 18.

Figure 11:
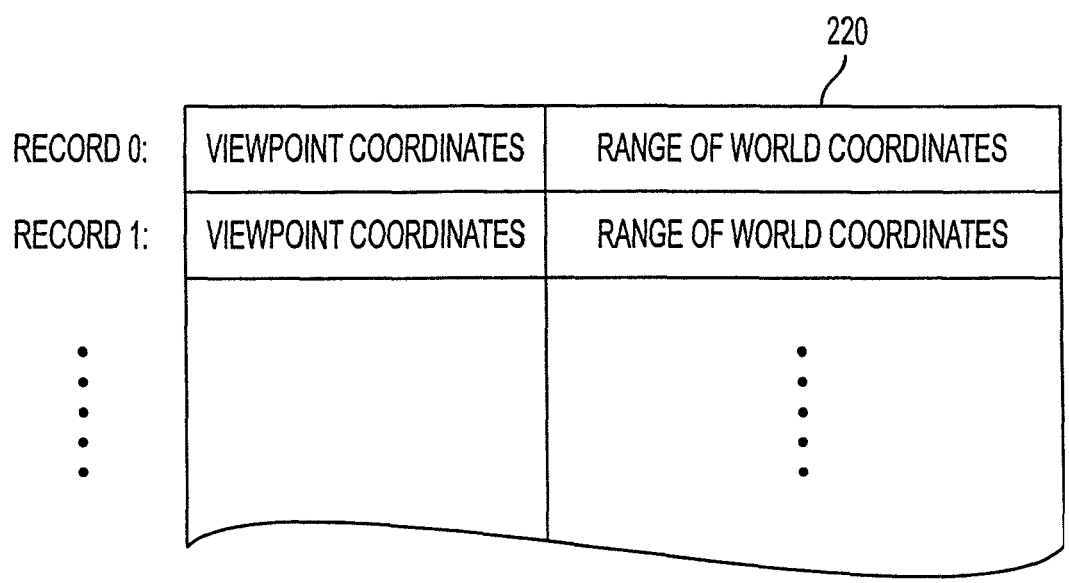
FIG. 11 is an explanatory diagram showing the parts of the viewpoint switching information table.

Next, in step S11, by the viewpoint switching means 206, it is decided whether the viewpoint can be switched. This decision is made, using a viewpoint switching information table 220. As shown in FIG. 11, the coordinates of the viewpoint and the range of the world coordinates controlled by the viewpoint are registered in each record in the viewpoint switching information table 220.

The decision is made by searching for records that include the world coordinates obtained in step S5 at the viewpoint switching information table 220, and comparing the coordinates of the viewpoint registered in the looked-up records with the coordinates of the current viewpoint.

If the coordinates of the compared viewpoints are the same, one jumps from step S12 back to the processing, beginning with step S2, and the movements of character 106 according to the operation input at the current viewpoint are displayed as three-dimensional images. By repeating the processing of steps S3 through S11, one displays the image as seen from first camera viewpoint 100, for example, an image of character 106 running straight along main road 104, as shown in FIG. 5.

If, on the other hand, the coordinates of the compared viewpoints are different, the switching of viewpoints is considered necessary, and one proceeds from step S12 to step S13 and defines as the current viewpoint the viewpoint registered in the record found in step S5.

Next, in step S14, the operation input from controller 16 by the user is accepted. Then, in step S15, by means of the operation input decision means, it is decided whether there is a change in the operation input. If there is no change in the operation input and it is kept as is, one enters processing by the character motion direction maintenance means 214.

In this processing, first, in step S16, by the second vector computation means 216, the motion vector of character 106 by the current operation input as seen from the pre-switching viewpoint (the previous viewpoint) is computed; then, in step S17, by the second position computation means 218, the world coordinates of character 106 and its motion direction with respect to the current viewpoint are computed, based on the obtained motion vector.

Next, in step S18, by the image drawing means 208, the background image based on the current viewpoint is drawn to image memory 405. Then, in step S19, the position (world coordinates) of character 106 is converted to camera coordinates based on the current viewpoint.

Next, in step S20, the vertex data of the object data corresponding to character 106 is rewritten based on the obtained camera coordinates. Then, in step S21, by the image drawing means 208, rendering processing is done for the object data, and a three-dimensional image of character 106 is drawn to image memory 405. Next, in step S22, by means of image display means 210, the three-dimensional image data drawn to the image memory 405 is outputted to monitor 18 and the three-dimensional image is displayed on screen 110 of monitor 18. At the point at which the processing in step S22 terminates, one returns to the processing beginning at step 14.

By the processing from step S14 to step S22, that is, by the processing by direction maintenance means 214, when a change is made from the first scene of FIG. 5 to the second scene, as long as the operation in the first scene is maintained, as shown in FIG. 7, the one event due to the motion of character 106 immediately prior to the switching to the second scene (in this example, the event of proceeding straight along main road 104) will be reflected as is even after the change to the second scene.

In step S15, at the stage at which it is decided that the operation input has changed, one returns to the normal processing, beginning with step S4 in FIG. 9, and this time, in the scene shown in FIG. 7, what is displayed is the character 106 acting in accordance with the operation input. In step S2, at the stage at which there is a termination request to the image processing means 200, the processing by the image processing means 200 terminates.

Thus, in entertainment system 12 of this invention there is a direction maintenance means 214 by which if, along with the motion of any character 106 based on the operation input concerning the character motion direction, a switching is made from a first scene to a second scene and the operation input is maintained, the direction of motion of the character 106 in said second scene is maintained in coordination with the direction of motion of character 106 on the map in the first scene at least immediately before the switching is made, so even if the scene is switched from the first scene to the second scene, the one event due to the motion of character 106 immediately prior to the switching (for example, proceeding straight along main road 104) will be reflected as is also in the second scene which comes after the switching, the user will not need to alter the operation while confirming the direction every time the scene changes, and the operability of the entertainment device can be greatly improved.

Needless to say that the recording medium, program, program execution system, and program execution device of this invention are not limited to the afore-described embodiment but may adopt various compositions as long as they do not depart from the gist of this invention.

What is claimed is:

1. A method for outputting an image on a display in response to a signal received from an input device, the method comprising:
    displaying a visible object moving in a first direction in a first scene in response to the signal;
    looking up the coordinates of the visible object in a viewpoint switching information table, wherein the viewpoint switching information table uniquely associates a plurality of ranges of coordinates with a plurality of different scenes;
    changing the first scene to a second scene when the coordinates of the moving object are located in the range of coordinates associated with the second scene in the viewpoint switching information table; and
    maintaining a second direction of motion of the visible object in the second scene in coordination with the first direction in the first scene as long as the signal received from the input device before changing the scene is maintained.

2. The method according to claim 1, wherein the first scene is at a first perspective and the second scene is at a second perspective different than the first perspective.

3. The method according to claim 1, wherein the input device is controlled by a user.

4. The method according to claim 1, wherein the input device is a controller having buttons.

5. The method according to claim 4, wherein the controller has a direction pad for controlling the direction of the visible object on the display.

6. The method according to claim 1, wherein the first scene is changed to the second scene using a coordinate transformation.

7. The method according to claim 1, wherein the visible object is a character.

8. The method according to claim 1, wherein the visible object is located in a virtual three-dimensional world.

* * * * *